United States Patent [19]

Del Buono

[11] Patent Number: 5,454,575
[45] Date of Patent: Oct. 3, 1995

[54] SYSTEMS FOR RECEIVING AND SUPPORTING CHILD CAR SEATS

[76] Inventor: Deborah M. Del Buono, P.O. Box 6352, Wolcott, Conn. 06716

[21] Appl. No.: 202,768

[22] Filed: Feb. 28, 1994

[51] Int. Cl.⁶ .................. B62B 3/02; B62B 3/10
[52] U.S. Cl. ............ 280/35; 108/120; 280/641; 280/651
[58] Field of Search .................. 108/120, 119; 280/32.6, 35, 639, 641, 649, 651, 47.34

[56] References Cited

U.S. PATENT DOCUMENTS

| | | | |
|---|---|---|---|
| 1,630,279 | 5/1927 | Stroop et al. | 280/641 |
| 2,422,862 | 6/1947 | Stottrup | 280/641 |
| 2,492,676 | 12/1949 | Zajicek | 280/641 |
| 3,082,016 | 3/1963 | Pratt | 280/641 |
| 4,111,454 | 9/1978 | Kassai | 280/649 |
| 4,199,170 | 4/1980 | Hubner et al. | 280/641 |
| 4,967,672 | 11/1990 | Leather | 108/120 |

*Primary Examiner*—Eric D. Culbreth
*Assistant Examiner*—Michael Mar

[57] ABSTRACT

A system for receiving and supporting a child car seat comprising a dolly having a rectangular support plate with a rectangular opening of a size and shape to receive the lower surface of a child car seat, the support plate having interleaved webbing at the lower extent of the opening for providing support to a child car seat located thereabove; securement means in the form of a strap and buckle secured to the side edges of the support plate adapted to releasably couple a child car seat to the support plate; a plurality of legs, the legs arranged in two pair including a first pair of legs pivotally secured at their upper ends to the opposed edges of the support plate; the second pair of legs slidably secured at their upper ends to other opposed edges of the support plate, a slidable coupling including tubular sleeves pivotally coupled to the support plate with the upper ends of the second pair of legs slidably received therein, the second legs each comprising a release button for retaining the sleeve at the upper end of the second legs and the legs in an extended operative orientation, the buttons adapted to be depressed to allow the second pair of legs to slide within the sleeves for movement to a collapsed orientation.

1 Claim, 4 Drawing Sheets

FIG. 5
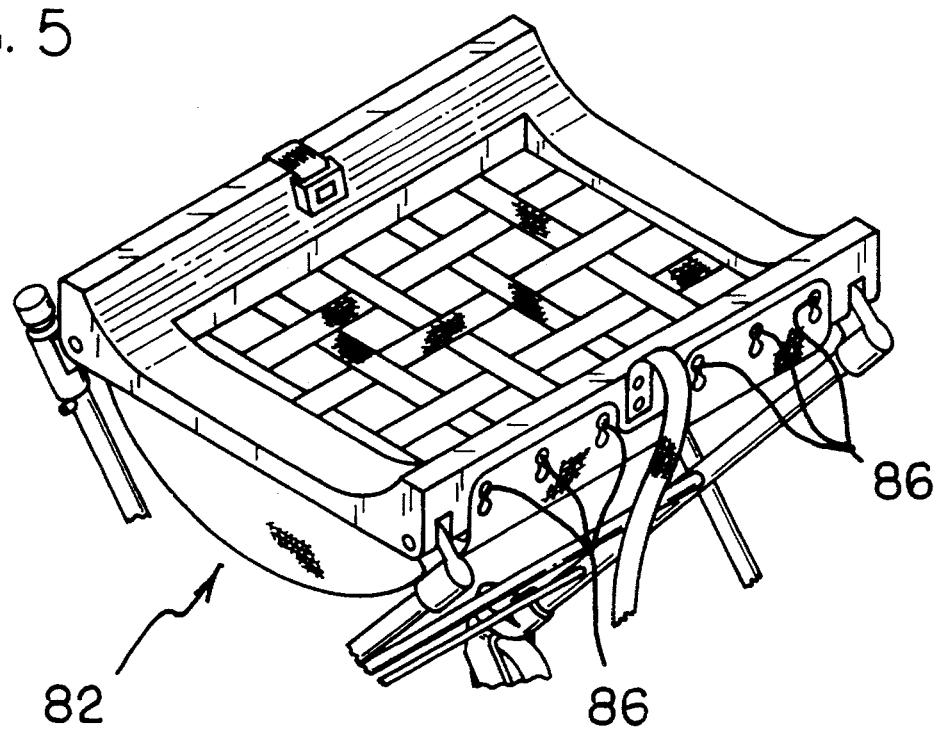
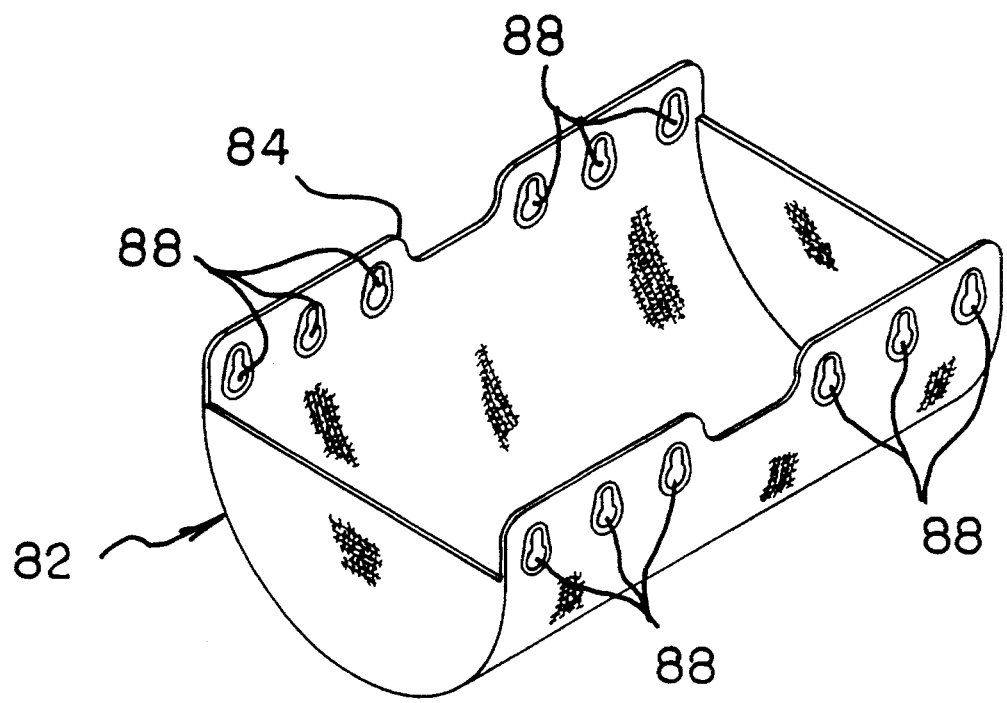
FIG. 6

SYSTEMS FOR RECEIVING AND SUPPORTING CHILD CAR SEATS

BACKGROUND OF THE INVENTION

1. Field of the Invention

The present invention relates to systems for receiving and supporting child car seats and more particularly pertains to receiving and supporting child seats and for allowing the movement thereof.

2. Description of the Prior Art

The use of child car seats and associated supports is known in the prior art. More specifically, child car seats and associated supports heretofore devised and utilized for the purpose of supporting car seats for children in a convenient manner are known to consist basically of familiar, expected, and obvious structural configurations, notwithstanding the myriad of designs encompassed by the crowded prior art which has been developed for the fulfillment of countless objectives and requirements.

The prior art discloses a large number of child car seats and associated supports. By way of example, U.S. Pat. No. 3,549,164 to Raynor discloses a combination baby stroller and vehicle seat.

U.S. Pat. No. 4,685,688 to Edwards discloses a combined child safety car seat and stroller.

U.S. Pat. No. 4,768,795 to Mar discloses a multi-purpose stroller with detachable frame.

U.S. Pat. No. 4,921,261 to Sadler, Jr. discloses an infant conversion stroller.

Lastly, U.S. Pat. No. 5,121,940 to March discloses a collapsible infant seat carrier.

In this respect, systems for receiving and supporting child car seats according to the present invention substantially depart from the conventional concepts and designs of the prior art, and in doing so provide an apparatus primarily developed for the purpose of receiving and supporting child seats and for allowing the movement thereof.

Therefore, it can be appreciated that there exists a continuing need for new and improved systems for receiving and supporting child car seats which can be used for receiving and supporting child seats and for allowing the movement thereof. In this regard, the present invention substantially fulfills this need.

SUMMARY OF THE INVENTION

In view of the foregoing disadvantages inherent in the known types of child car seats and associated supports now present in the prior art, the present invention provides improved systems for receiving and supporting child car seats. As such, the general purpose of the present invention, which will be described subsequently in greater detail, is to provide new and improved systems for receiving and supporting child car seats and methods which have all the advantages of the prior art and none of the disadvantages.

To attain this, the present invention essentially comprises a new and improved system for receiving and supporting child car seats comprising, in combination, a dolly having a rectangular support plate with a rectangular opening of a size and shape to receive the lower surface of a child car seat, the support plate having interleaved webbing at the lower extent of the opening for providing support to a child car seat located thereabove; securement means in the form of a strap and buckle secured to the side edges of the support plate adapted to releasably couple a child car seat to the support plate; a plurality of legs, the legs arranged in two pair including a first pair of legs pivotally secured at their upper ends to the opposed edges of the support plate; the second pair of legs slidably secured at their upper ends to other opposed edges of the support plate, a slidable coupling including tubular sleeves pivotally coupled to the support plate with the upper ends of the second pair of legs slidably received therein, the second legs each comprising a release button for retaining the sleeve at the upper end of the second legs and the legs in an extended operative orientation, the buttons adapted to be depressed to allow the second pair of legs to slide within the sleeves for movement to a collapsed orientation; casters located at the bottom end of each of the legs to facilitate pushing the dolly; a storage bag having an upper rectangular configuration conforming generally to the lower rectangular configuration of the support plate with releasable securement means to separably retain the bag at a location beneath the webbing; and a push handle secured to the support plate, the support plate being provided with linear cylindrical recesses to allow movement of the handle into the support for storage purposes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved systems for receiving and supporting child car seats which have all the advantages of the prior art child car seats and associated supports and none of the disadvantages.

It is another object of the present invention to provide new and improved systems for receiving and supporting child car seats which may be easily and efficiently manufactured and marketed.

It is a further object of the present invention to provide new and improved systems for receiving and supporting child car seats which are of a durable and reliable construction.

An even further object of the present invention is to provide new and improved systems for receiving and supporting child car seats which are susceptible of a low cost of manufacture with regard to both materials and labor, and which accordingly are then susceptible of low prices of sale to the consuming public, thereby making such systems for receiving and supporting child car seats economically available to the buying public.

Still yet another object of the present invention is to provide new and improved systems for receiving and supporting child car seats which provide in the apparatuses and methods of the prior art some of the advantages thereof, while simultaneously overcoming some of the disadvantages normally associated therewith.

Even still another object of the present invention is to receive and support child seats and to allow the movement thereof.

Lastly, it is an object of the present invention to provide a system for receiving and supporting a child car seat comprising a dolly having a rectangular support plate with a rectangular opening of a size and shape to receive the lower surface of a child car seat, the support plate having interleaved webbing at the lower extent of the opening for providing support to a child car seat located thereabove; securement means in the form of a strap and buckle secured to the side edges of the support plate adapted to releasably couple a child car seat to the support plate; a plurality of legs, the legs arranged in two pair including a first pair of legs pivotally secured at their upper ends to the opposed edges of the support plate; the second pair of legs slidably secured at their upper ends to other opposed edges of the support plate, a slidable coupling including tubular sleeves pivotally coupled to the support plate with the upper ends of the second pair of legs slidably received therein, the second legs each comprising a release button for retaining the sleeve at the upper end of the second legs and the legs in an extended operative orientation, the buttons adapted to be depressed to allow the second pair of legs to slide within the sleeves for movement to a collapsed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is perspective view of the system shown in FIG. 1 but illustrating an alternate embodiment of the invention.

FIG. 6 is an enlarged perspective view of the storage mechanisms utilized in the FIG. 5 embodiment.

The same reference numerals refer to the same parts throughout the various Figures.

DESCRIPTION OF THE PREFERRED EMBODIMENT

Figure 1:
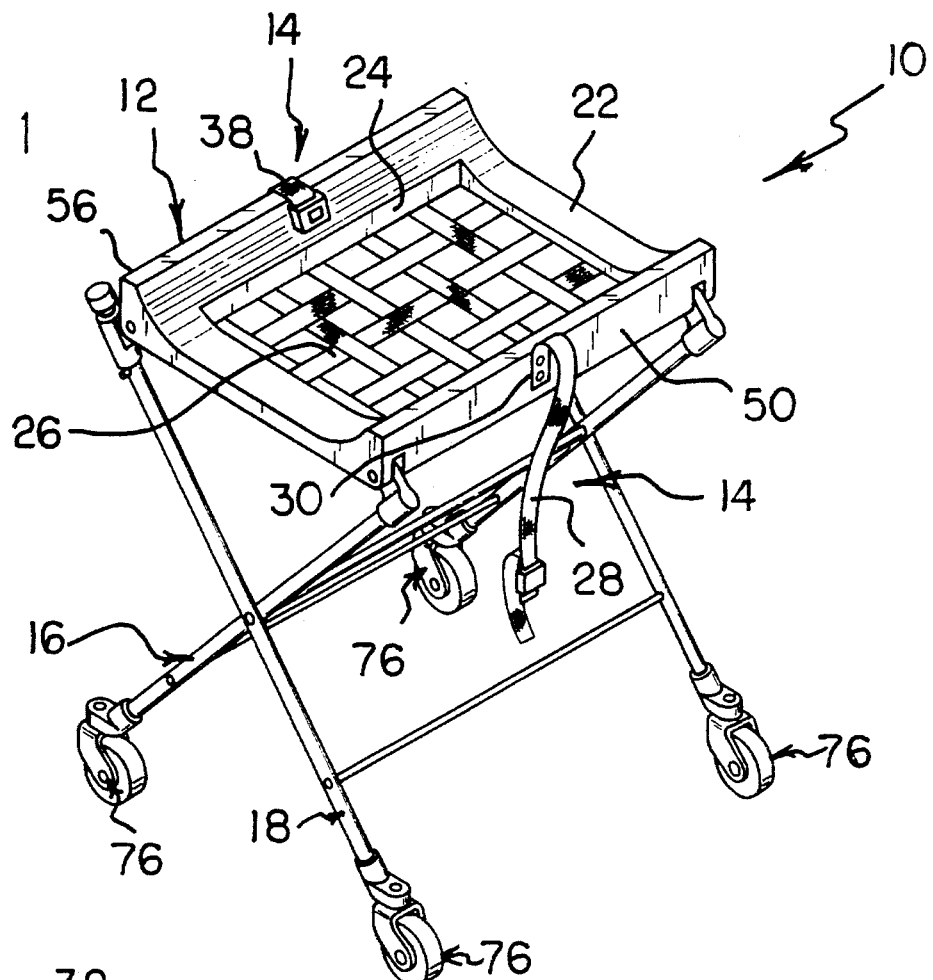
FIG. 1 is a perspective illustration of the preferred embodiment of the new and improved system for receiving and supporting child car seats constructed in accordance with the principles of the present invention.

With reference now to the drawings, and in particular to FIGS. 1 through 4 thereof, the preferred embodiment of the new and improved system for receiving and supporting child car seats embodying the principles and concepts of the present invention and generally designated by the reference numeral 10 will be described.

Specifically, the system of the present invention, systems for receiving and supporting child car seats, may be considered as constructed of four major components. Such major components are the dolly 12, the securement means 14, the first pair of legs 16 and the second set of legs 18. These components interreact to achieve the intended objects and advantages.

More specifically, the dolly 12 is constructed of a rigid, rectangular support plate 22. The support plate has a rectangular opening 24 of a size and shape to receive the lower surface of a conventional child car seat, not shown. The support plate 22 is also provided with interleaved webbing 26. Such webbing is secured at its ends at the lower extent of the opening 24 along all four sides of the opening. The webbing functions for providing support to the child car seat located thereabove. The bottom of the child car seat is located on the webbing and within the opening. As a result, the edges of the opening preclude undesired lateral movement of the car seat within the opening for safety purposes.

The next major component of the system is the securement means 14. The securement means is in the form of a strap 28. The strap is secured at one end 30 to a side of the support plate. The opposite end 32 of the strap 28 is provided with an apertured tongue 34. A second strap 38 is secured at its first end 40 to the opposite side of the support plate. The second end 42 of the second strap 38 is provided with a buckle. Such buckle is adapted to releasably secure the tongue 34 of the first strap 28. The securement means functions to releasably couple a child car seat located on the webbing to the support plate during operation and use.

Figure 2:
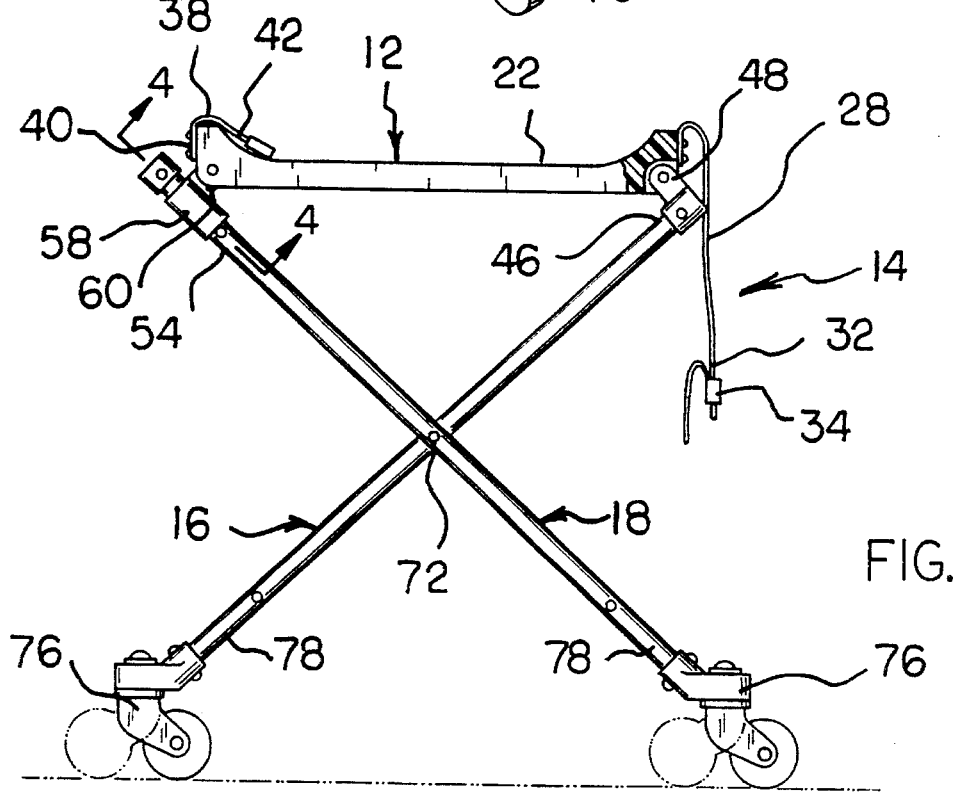
FIG. 2 is an end elevational view of the system shown in FIG. 1.
Figure 3:
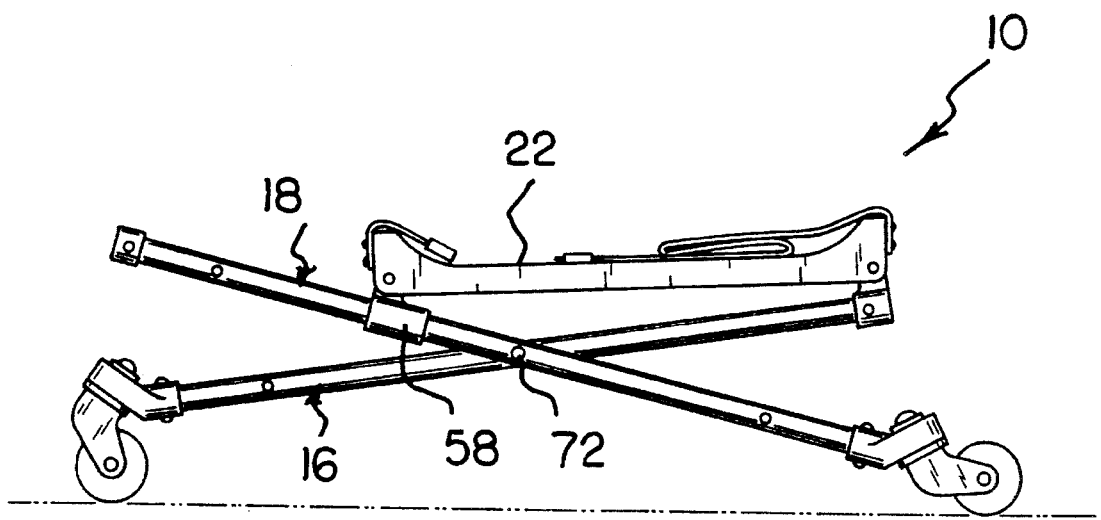
FIG. 3 is an end elevational view similar to FIG. 2 but showing the device in a collapsed orientation.

The plurality of legs used for supporting the support plate include a first pair of legs 16. The first pair of legs are pivotally secured at their upper ends 46 by hinges 48 to the front edge 50 of the support structure. FIGS. 1 and 2 show the first pair of legs in the operative position. FIG. 3 shows such legs in the collapsed position for storage.

A second pair of legs 18 are also provided. Such second pair of legs are secured at their upper ends 54 to the rear edge 56 of the support plate. The coupling therebetween is through a pair of tubular sleeves 58. The tubular sleeves are pivotally coupled to the support plate through hinges 60. The upper ends 54 of the second pair of legs 18 are slidably received within sleeves 58.

Figure 4:
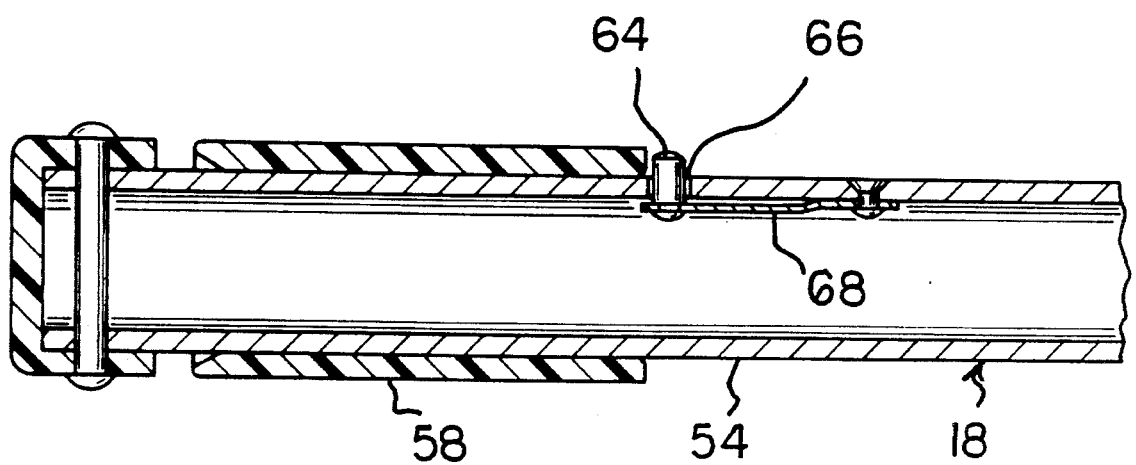
FIG. 4 is a sectional view of one end of the collapsing mechanisms as shown in FIGS. 1, 2 and 3.

Each of the second legs 18 is provided with a depressible button 64 held in the position through a hole 66 in the legs near their upper ends 54 by a leaf spring 68. With the button in the extended position as shown in FIG. 4, the tubular sleeve 58 is precluded from sliding movement with respect to the leg 18 therewithin. Upon depressing the button 64, the leg may slide within the sleeve to allow collapsing of the legs to the storage orientation as shown in FIG. 3.

Pivot pins 72 at central extents of the first legs 16 and second legs 18 effect their pivotal coupling to allow the legs to remain in the proper orientation with respect to each other when pivoting between the operative orientation and the collapsed orientation. This effects a scissor-like movement between the legs.

The last component of the primary embodiment of the invention is a plurality of casters 76. The casters are secured to the lower edges 78 of each leg. The casters allow for the convenient pushing of the dolly along the ground during operation and use.

The alternate embodiment of the invention as shown in FIGS. 5 and 6 features a storage bag 82. The storage bag has an upper edge 84 in a generally rectangular configuration. Such configuration conforms generally to the lower rectangular configuration of the external periphery of the support plate. Coupling therebetween is through a releasable securement means. Such releasable securement means includes buttons 86 along opposed sides of the support plate. Such securement means also includes button holes 88 along opposed side edges of the storage bag to effect releasable coupling therebetween. The storage bag is thus separably retained by securing the bag at a location between the webbing.

Figure 7:
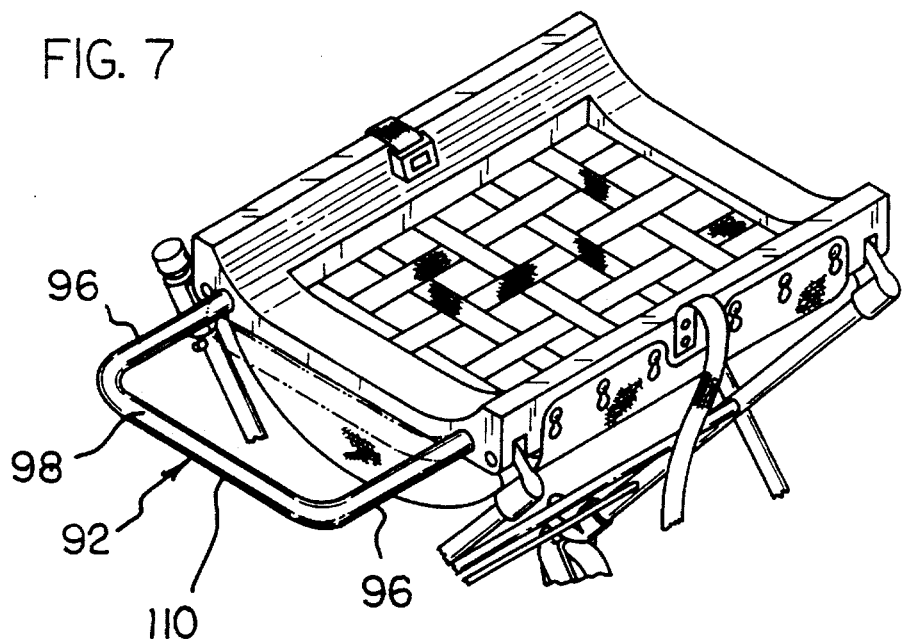
FIG. 7 is a perspective view of the system of FIGS. 1 and but illustrating another alternate embodiment of the invention.
Figure 8:
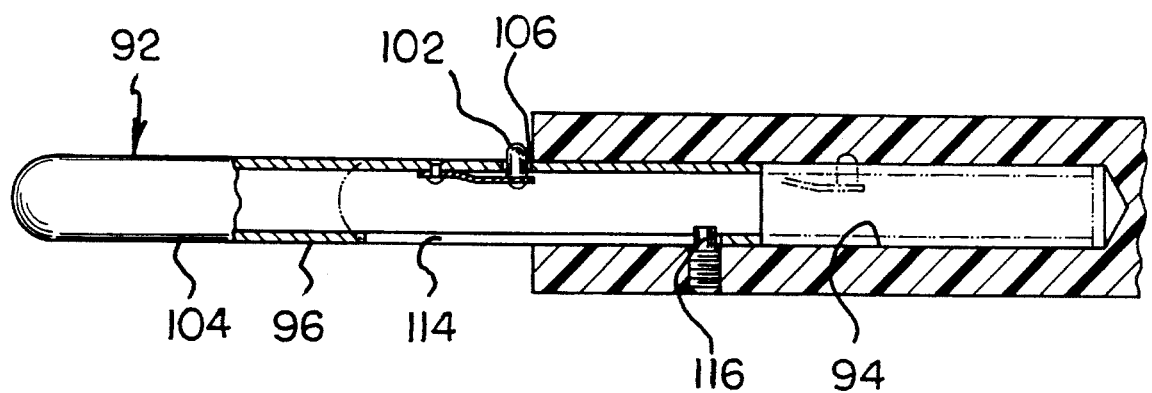
FIG. 8 is a cross-sectional view of the handle taken along line 8—8 of FIG. 7.

The next alternate embodiment of the invention is shown in FIGS. 7 and 8. In such embodiment, a push handle 92 is provided for the convenience of the user in pushing the dolly from one location to the next. To support such push handle, a pair of parallel linear cylindrical recesses 94 are formed in one edge, the rear edge of the support plate. Located within the recesses are the parallel edges 96 of the handle 98. A button 102 is positioned within one of the tubes 104 extending through a hole 106. Depressing the button 102 allows the handle to be slid into the recesses 94 exposing only the cross bar 110 of the handle. Pulling the handle outwardly from the recess will allow the button to move to its position exterior of the bar to lock it in position. A slot 114 linearly extending on the lower edge of the tube 104 functions with a fixed pin 116 to limit the extent to which the handle may be pulled to preclude separation therebetween.

The present invention is a collapsible four-wheeled dolly which will support a baby car seat when it is unfolded. It is used in place of a stroller when the baby is removed from the vehicle. This product will virtually eliminate the need to store a stroller in a car. In instances where the car does not have sufficient room for a stroller, the benefits of the present invention will be realized. That is, its collapsible feature enables it to be stored in very little space. In addition, removing the baby from a warm car seat in cold weather is disturbing to both the child and the caregiver. This occurs also if the baby is transferred to a cold stroller which had to be stored in the trunk. Lifting the baby in the car seat and setting it into the present invention is clearly the best way to handle the child.

The present invention dolly is made of steel, forming a frame which collapses in a scissors-like manner at two joints, into a very compact package. It has a square base, with wheels or casters at each corner for stability. It rolls easily and is always under control using the handle bar across the top of the car seat. When it is unfolded and the joints are locked, the car seat fits perfectly into the cradle provided for it. This process is much easier than removing the bulky and heavy stroller, unfolding it, then removing the baby from the car seat and transferring it into the dolly.

The present invention is lightweight, easy to use, and can be produced in a variety of colors to match the car seat. Its major attribute is that it reduces the shuffling required when using a conventional stroller.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved system for receiving and supporting child car seats comprising, in combination:

a dolly having a rectangular support plate with a rectangular opening of a size and shape to receive the lower surface of a child car seat, the support plate having interleaved webbing of longitudinal and lateral straps in a rectangular configuration at the lower extent of the opening for providing support to a child car seat located thereabove;

securement means in the form of a single strap and buckle secured to a central extent of each side edge of the support plate adapted to releasably couple a child car seat to the support plate;

a plurality of legs, the legs arranged in two pairs with each leg of a first pair being pivotally connected to a respective leg of a second pair, the a first pair of legs being secured at their upper ends to a pair of connector members which are pivotally coupled to opposite ends of one side edge of the support plate;

the second pair of legs being slidably secured at their upper ends portions to a pair of slidable couplings, each coupling including a tubular sleeve pivotally coupled to opposite ends of an opposite side edge of the support plate with the upper end portions of the second pair of legs slidably received therein for movement along the second pair of legs, the second pair of legs each comprising a release button for retaining each sleeve at an uppermost end of the second legs when the legs are in an extended operative orientation, the buttons adapted to be depressed to allow the second pair of legs to slide within the sleeves for movement to a collapsed orientation;

casters located at a bottom end of each of the legs to facilitate pushing the dolly;

a storage bag having an upper rectangular configuration conforming generally to the lower rectangular configuration of the support plate with releasable securement means to separably retain the bag at a location beneath the webbing; and a push handle secured to the support plate, the support plate being provided with linear cylindrical recesses to allow movement of the handle into the support for storage purposes.

* * * * *